United States Patent [19]

Bruce

[11] Patent Number: 4,799,399
[45] Date of Patent: Jan. 24, 1989

[54] MANUALLY CONTROLLED MULTIPLE SPEED RATIO TRANSMISSION

[75] Inventor: Robert W. Bruce, Livonia, Mich.

[73] Assignee: Ford Motor Company, Dearborn, Mich.

[21] Appl. No.: 299,905

[22] Filed: Sep. 8, 1981

[51] Int. Cl.$^4$ .................. G05G 5/10; F16H 3/08; B60K 20/10; B60K 20/00

[52] U.S. Cl. .......................... 74/477; 74/339; 74/359; 74/331; 74/473 R

[58] Field of Search ............ 74/740, 331, 342, 356, 74/357, 359, 339, 473 R, 476, 477, 701

[56] References Cited

U.S. PATENT DOCUMENTS

| | | | |
|---|---|---|---|
| 3,173,303 | 3/1965 | Galaniuk | 74/360 X |
| 3,283,601 | 11/1966 | West et al. | 74/335 |
| 3,318,167 | 5/1967 | Frost | 74/356 X |
| 3,318,168 | 5/1967 | De Coyle De Castelet | 74/331 X |
| 3,929,029 | 6/1975 | Kelbel | 74/477 X |
| 3,962,930 | 6/1976 | Frazee | 74/473 R |
| 4,000,662 | 1/1977 | Wolfe | 74/359 X |
| 4,022,079 | 5/1977 | Hidaka | 74/477 X |
| 4,033,200 | 7/1977 | Stockton | 74/740 |
| 4,094,206 | 6/1978 | Sogo et al. | 74/335 X |
| 4,174,644 | 11/1979 | Nagy et al. | 74/476 X |
| 4,193,316 | 3/1980 | Kelbel | 74/477 |
| 4,222,281 | 9/1980 | Mylenek | 74/473 R X |
| 4,228,693 | 10/1980 | Kelbel | 74/477 X |
| 4,307,624 | 12/1981 | Mylenck | 74/477 |
| 4,377,093 | 3/1983 | Janson | 74/477 |

FOREIGN PATENT DOCUMENTS 1188598 4/1970 United Kingdom ............ 74/473 R

*Primary Examiner*—Allan D. Herrmann
*Attorney, Agent, or Firm*—Frank G. McKenzie; Donald J. Harrington

[57] ABSTRACT

A multiple speed ratio manually controlled transmission mounted transversely with respect to the fore and aft axis of the automotive vehicle in which it operates includes a power input shaft having four forward drive gears and a reverse drive gear formed integrally therewith. A fourth speed ratio gear of the input shaft is continuously engaged with a fourth speed pinion journalled on a countershaft and a fifth speed pinion journalled on an auxiliary countershaft. The first, second and third forward speed gears of the input shaft are continuously engaged with corresponding pinions journalled on the countershaft. A first final drive gear fixed to the countershaft and a second final drive gear fixed to the auxiliary countershaft are each continuously engaged with a final drive gear that transmits power to the differential.

4 Claims, 9 Drawing Sheets

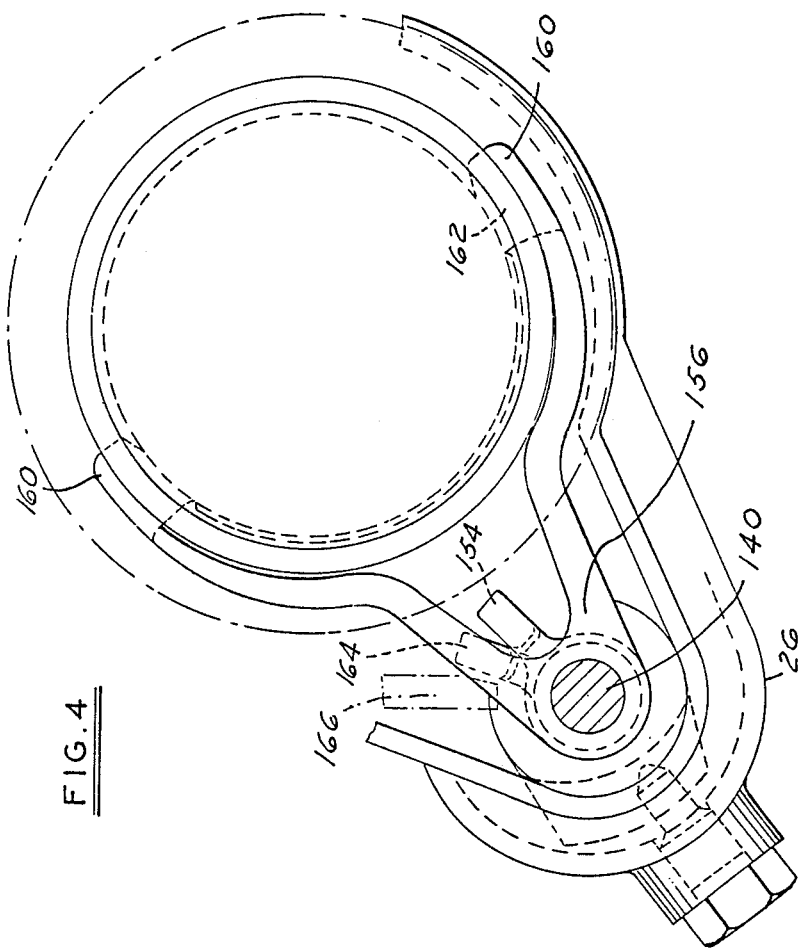

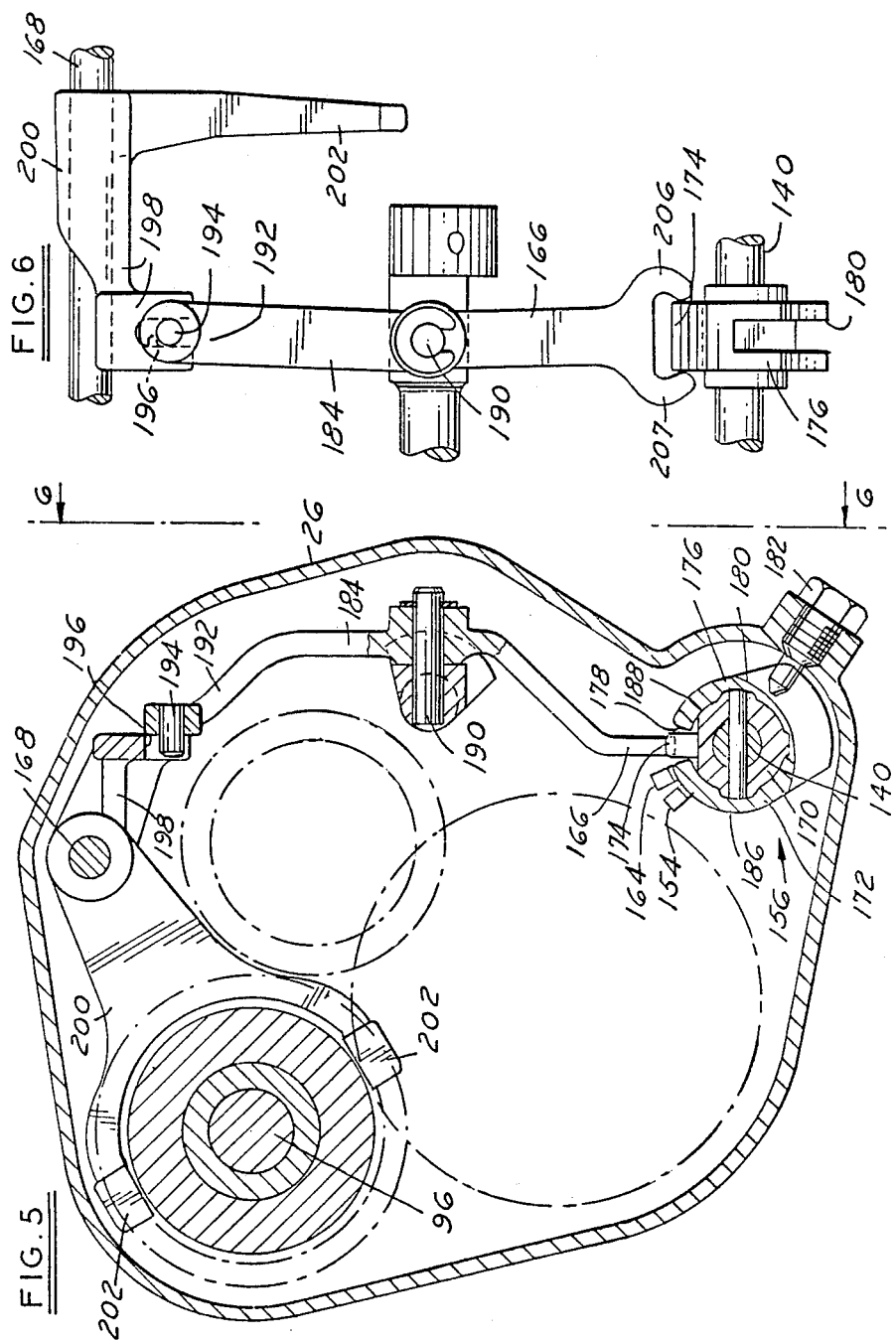

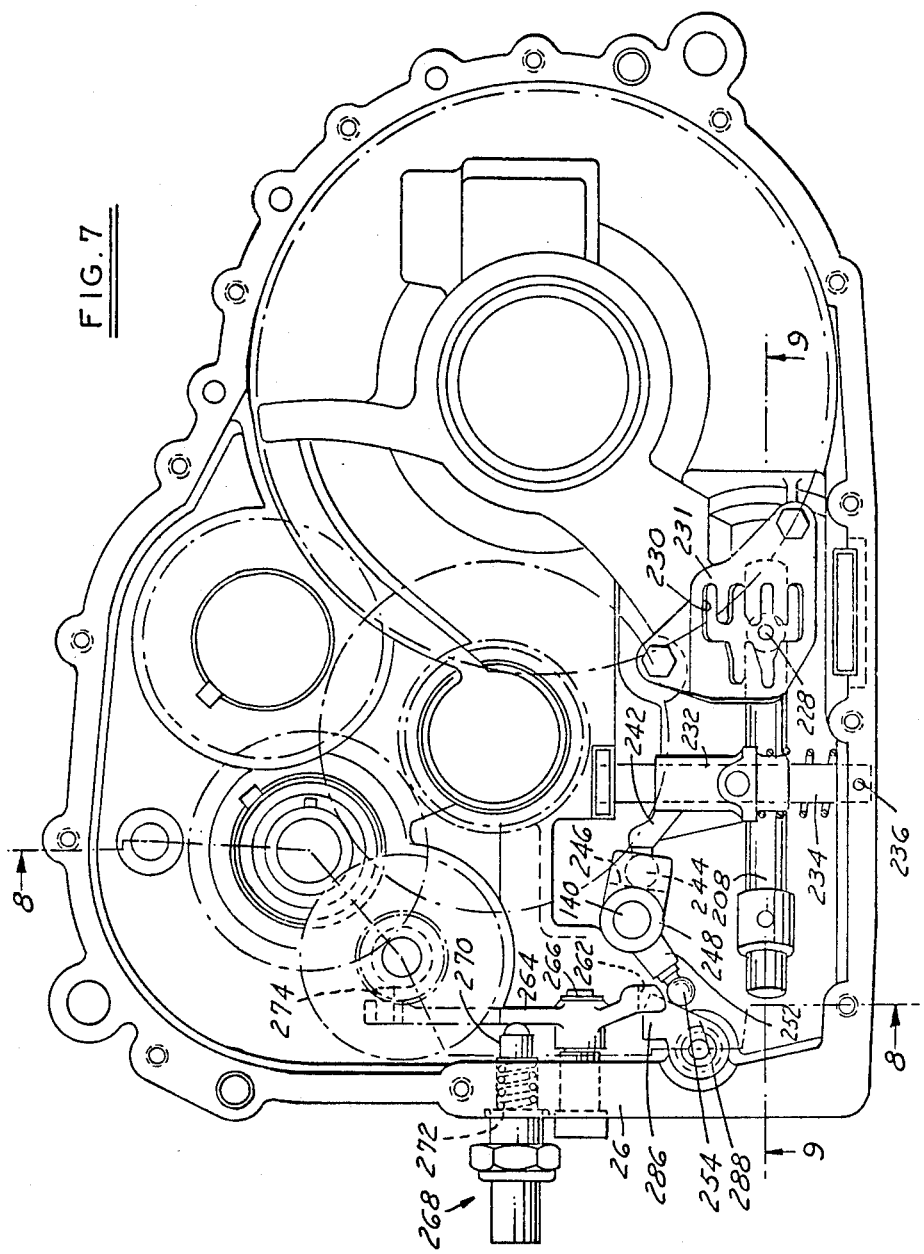

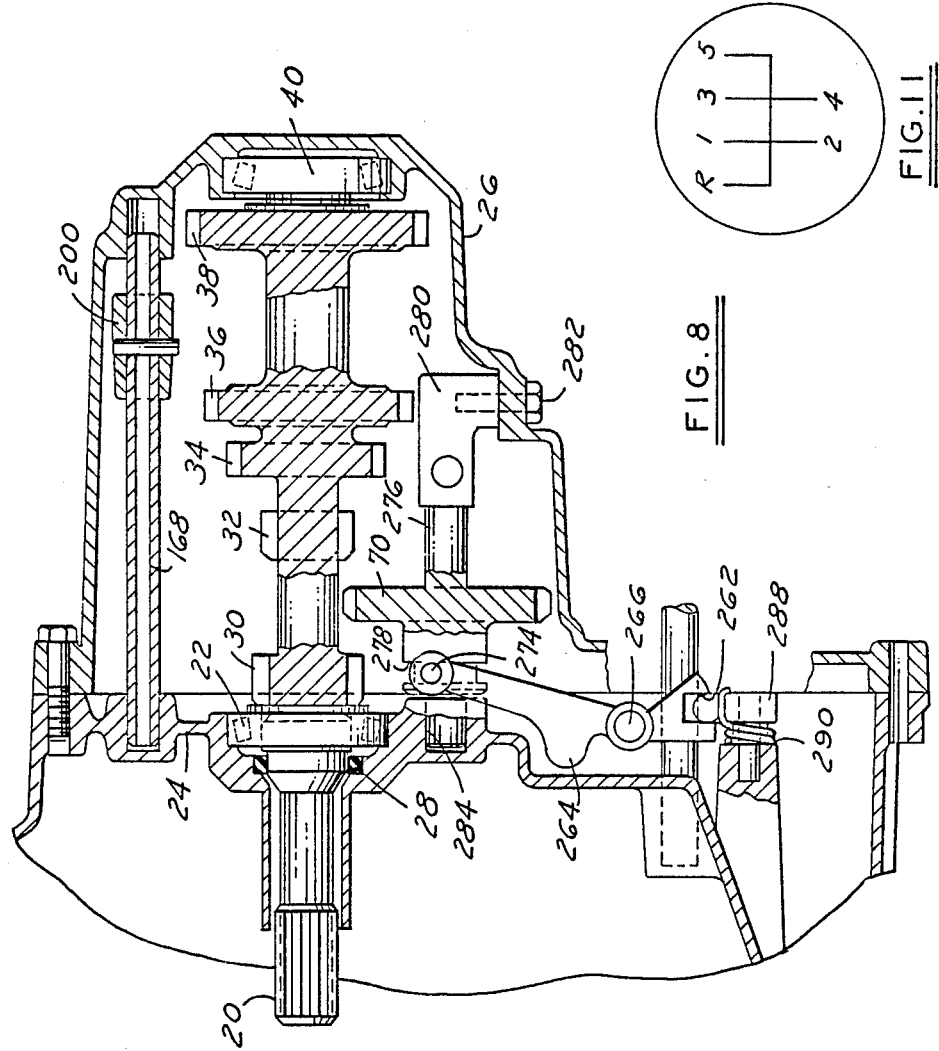

MANUALLY CONTROLLED MULTIPLE SPEED RATIO TRANSMISSION

BACKGROUND OF THE INVENTION

1. Field of the Invention

This invention relates generally to the gear arrangement and shift mechanism for an automotive vehicle transmission, and especially to a transaxle transmission mechanism wherein a common axis of the engine and transmission is transversely disposed with respect to the fore-and-aft axis of the vehicle.

2. Description of the Prior Art

In general, a multiple speed ratio, manual transmission that provides five forward speed ratios will require a longer axial dimension than a transmission having four speed ratios. In front wheel drive road vehicles it is necessary that the transmission have a minimum axial dimension because of the restricted space available in the transverse direction into which the engine and transaxle must be fitted.

The transmission according to this invention permits a substantial reduction in the longitudinal dimension of the transmission. This advantage is realized because the mechanism includes, in addition to the input shaft, two countershafts. The first countershaft carries the four lower speed ratio gears, the second countershaft carries only the fifth speed ratio gear. The second countershaft transmits power only in the fifth speed ratio, therefore, the gear arrangement for a four speed ratio transaxle can be derived from the gear arrangement of the five speed transmission by simply removing the auxiliary countershaft assembly and the fifth speed ratio shift mechanism that actuates the synchronizer on the second countershaft.

In the prior art where multiple countershafts are employed in a transmission of this type, each countershaft transmits power for at least two of the speed ratios in which the transmission may function. Such an arrangement is not adaptable to function with a lesser number of speed ratios upon the removal of one countershaft and the shift mechanism that operates to driveably connect the pinions to the countershaft on which they are journalled.

The shift mechanism that controls the operation of the transaxle according to this invention is so designed that the four lower speed ratios and the reverse drive can be selected without affecting that portion of the shift mechanism that controls the operation of the fifth speed ratio.

SUMMARY OF THE INVENTION

The multiple speed ratio manually controlled transmission of this invention includes a power input shaft that has several pinions fixed thereto for producing the lower forward speed ratios and an additional pinion that furnishes a portion of the torque delivery path for two higher speed ratios. A final drive gear is disposed parallel to the input shaft and transmits power to the differential mechanism. A primary countershaft parallel to the input shaft has an output pinion continuously meshing with the final drive gear to transmit torque from the countershaft for all of the forward speed ratios produced by the gears journalled on this countershaft. A second countershaft parallel to the input shaft has a second output pinion that is also continuously in meshing engagement with the final drive gear. This pinion transmits torque from the second countershaft that is applied to the countershaft by an additional forward speed ratio gear journalled thereon. Two double-acting synchronizer clutches can be shifted axially on the first countershaft to driveably connect the forward drive gears to the countershaft on which they are journalled. A third single-acting synchronizer clutch driveably connects the forward drive gear to the second countershaft.

One gear of the primary countershaft and the gear on the auxiliary countershaft are arranged to be driven by a common drive gear on the input shaft at two mesh points located approximately 70° apart. Similarly, the drive pinions on the auxiliary and primary countershafts are in mesh with the final reduction drive gear, which powers the driving wheels through the differential. Therefore, the auxiliary countershaft transmits power for only one forward speed ratio. Accordingly, the transmission according to this invention can be modified to produce a multiple forward speed ratio transmission having the number of forward speed ratios that corresponds to the number of forward speed gears carried by the input shaft and by the primary countershaft. By removing the gear of the secondary countershaft, the synchronizer mounted thereon and the countershaft mounted on the transmission casing, the number of forward speed ratios in which the transmission can operate can be reduced. For example, if the gear on the second countershaft is part of the fifth speed ratio torque delivery path, the transmission can be modified to operate in four forward speed ratios.

No modification need be done to the transmission casing to accommodate the fifth speed ratio. The length of the transmission casing, a critical dimension that is preferably kept small in a motor vehicle in which the engine and transmission are transversely mounted, is the same for the five speed ratio transmission as it is for the four speed ratio transmission.

BRIEF DESCRIPTION OF THE DRAWINGS

FIG. 4 is a cross-sectional view taken at the plane 4—4 of FIG. 3 showing the interlock on the first shift rail, the shift forks and the fifth speed ratio bellcrank adjacent the selector finger.

FIG. 5 is a cross-sectional view taken at the plane 5—5 of FIG. 1 showing a second shift rail and a third shift fork mounted thereon adapted to produce fifth speed ratio operation.

FIG. 6 is a side view of the fifth speed ratio fork-shifting bellcrank taken in the direction 6 of FIG. 5.

FIG. 7 is an end view of a portion of the transmission shift mechanism and the gear arrangement.

FIG. 8 is a cross-sectional view taken at the discontinuous plane marked 8—8 of FIG. 7 showing the reverse idler shift mechanism.

FIG. 11 is a diagram showing the motion pattern of a manually controlled shift cane operated by the vehicle operator to select the various driving ratios of the transmission.

DESCRIPTION OF THE PREFERRED EMBODIMENT

Figure 1:
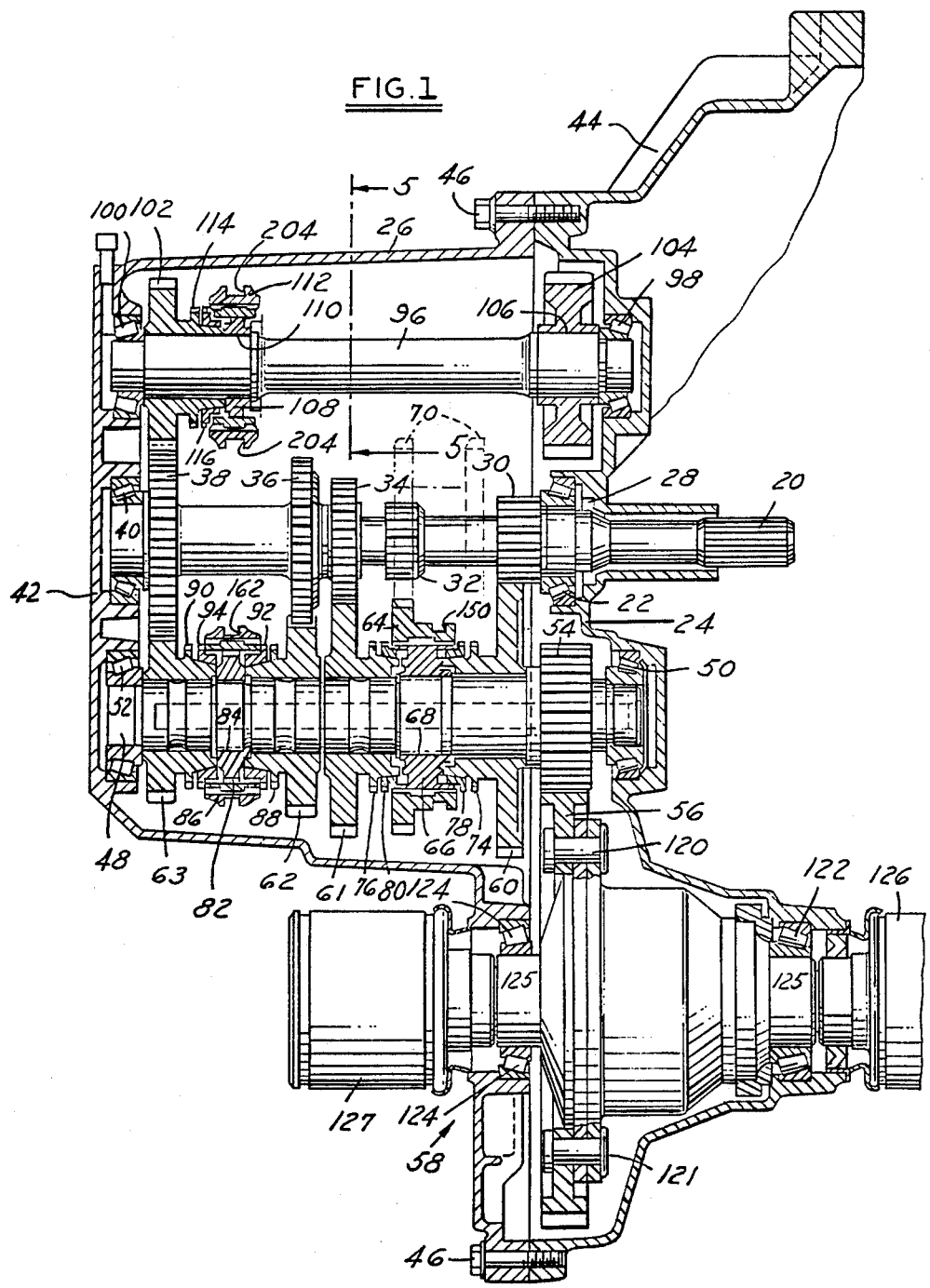
FIG. 1 is a cross-sectional view of the transmission gearing arrangement for my invention taken at the plane 1—1 of FIG. 2.
Figure 2:
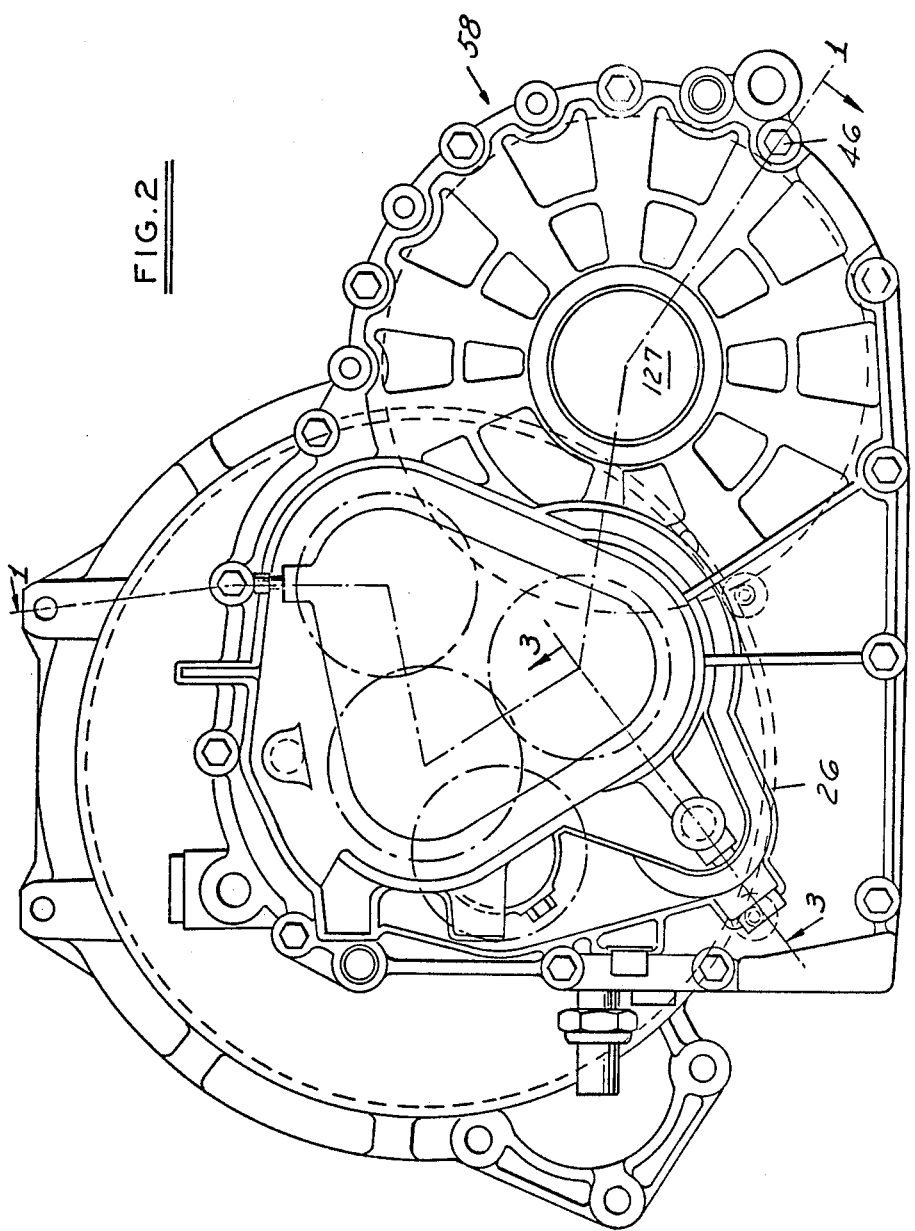
FIG. 2 an end view of the transmission assembly that is partially shown in cross-section in FIG. 1.

Referring first to FIG. 1, an input shaft 20 is journalled in a bearing 22 mounted in the support wall 24 of the clutch housing 44. A shaft seal 28 located in an annular recess formed in the support wall 24 seals the outer periphery of the shaft 20.

Formed on or carried by the shaft 20 are five torque input pinions shown respectively at 30, 32, 34, 36, 38. These pinions form torque delivery paths for operation in low speed ratio, reverse, second speed ratio, third speed ratio, and fourth speed ratio, respectively. Pinion 38 also operates to provide a portion of the torque delivery path for the fifth speed ratio. The left end of the input shaft is journalled by bearing 40 in a bearing opening formed in the end wall 42 of the housing 26. The right-hand end of the housing 26 is bolted to the left-hand end of the clutch housing 44 by the attachment bolts 46.

A countershaft 48 is journalled at one axial end in the bearing 50, which is received in a recess formed in right-hand wall 24 and at the opposite end in the bearing 52, which is received in a recess formed in the end wall 42. A first final drive pinion 54 is fixed to or integrally formed with countershaft 48 and meshes with the final drive gear 56, which drives a differential gear assembly designated generally by the reference character 58. Countershaft 48 supports gears 60–63, which form a part of the torque delivery paths for low speed ratio, second speed ratio, third speed ratio and fourth speed ratio, respectively. The output gears 60–63 are journalled on the outer surface of the countershaft 48.

A reverse gear 64 formed integrally with the 1-2 synchronizer sleeve is carried by the synchronizer hub 66, which is splined at 68 to the countershaft 48. The reverse gear 64 is splined to the outer periphery of the synchronizer hub 66 and is adapted for axial sliding movement on the hub. A reverse drive idler pinion 70 moves within the range shown in FIG. 1 and is adapted to engage the gear 64. The reverse idler pinion 70 can be moved axially on a reverse pinion support shaft 276 (FIG. 8) on which it is journalled. When reverse gear 64 is in the central position indicated in FIG. 1 and when the reverse idler pinion 70 is shifted in the left-hand direction as seen in that figure, the idler pinion 70 is brought into engagement with the reverse input pinion 32 and with reverse gear 64 thereby completing a reverse torque delivery path between the input shaft 20 and the final drive pinion 54. When operating the transmission in any ratio except reverse ratio, the reverse idler pinion 70 assumes the position at the left-hand end of its support shaft 276 as seen in FIG. 8. When reverse gear 64 is shifted in a left-hand direction, the clutch teeth 76 on the gear 61 engage with the internal clutch teeth of the reverse gear 64, thereby establishing a driving connection between countershaft 48 and output gear 61. Synchronizer clutch ring 80 establishes synchronism before the clutching engagement.

The 1-2 synchronizer clutch hub 66 is splined at 68 to countershaft 48 and has external splines on which the internally synchronizer clutch sleeve 64 is slideably mounted. Sleeve 64 has internal clutch teeth that are adapted to engage external clutch teeth 74, 76 formed respectively on the hubs of the output gears 60 and 61. The synchronizer clutch rings 78, 80 are located between the synchronizer clutch hub 66 and the output gears to establish rotational synchronism between countershaft 48 and either output gear 60 or 61 depending on the direction in which synchronizer clutch sleeve 64 is moved.

A 3-4 synchronizer clutch hub 82 is splined at 84 to countershaft 48 and has external splines on which the internally splined synchronizer clutch sleeve 86 is slideably mounted Sleeve 86 has internal clutch teeth that are adapted to engage external clutch teeth 88, 90 formed respectively on the hubs of the output gears 62 and 63. In the conventional way, the synchronizer clutch rings 92, 94 are positioned between the synchronizer clutch hub 82 and the output gears 62 and 63 to establish rotational synchronism between the countershaft 48 and either output gear 62 or 63, depending upon the direction in which the synchronizer clutch sleeve 86 is moved.

An auxiliary or second countershaft 96 is supported at one axial end by the bearing 98, which is received in a recess formed in the end wall 24, and at the opposite axial end by the bearing 100, which is carried by a recess in the end wall 42. A fifth speed ratio gear 102, which is journalled on the outer surface of the auxiliary countershaft 96, is also in meshing engagement with pinion 38 as is the fourth speed gear 63. Pinions 63 and 102 are, however, not engaged with each other. At the opposite axial end of the auxiliary crankshaft, a fifth speed ratio final drive pinion 104 is joined to the auxiliary countershaft 96 by the splines 106 and is in meshing engagement with final drive gear 56 of the differential assembly as is pinion 54. Intermediate the fifth speed gear 102 and the fifth speed pinion 104, a third synchronizer clutch hub 108 is splined at 110 to the countershaft 96. Hub 108 has external splines on which an internally splined synchronizer clutch sleeve 112 is mounted. Sleeve 112 is formed with internal clutch teeth that are adapted to engage external clutch teeth 114 formed on the hub of the fifth speed input gear 102. A synchronizer clutch ring 116 positioned between the external clutch teeth 114 and the synchronizer clutch 108 establishes rotational synchronism between the auxiliary countershaft 96 and the gear 102.

The differential gear assembly 58 includes the output gear 56 which is riveted to a flange formed on the differential assembly 58 at 120, 121. The differential assembly 58 is journalled at one end by the bearing 122 which is received in an annular recess formed on the end wall 24, and at the opposite axial end by the bearing 124, which is received in an annular recess formed in the transmission housing 26. Bevel gears (not shown) mounted on the driveshafts 125 transmit engine torque to each of two universal joints 126, 127 through which drive is transmitted to each of the front wheels of the vehicle.

The transmission is conditioned for first speed ratio operation by positioning reverse idler pinion 70 in the neutral position shown in FIG. 1 at the right-hand extremity of its travel and synchronizer sleeves 86, 112 in their neutral positions. The 1-2 synchronizer sleeve 64 is moved to the right to establish clutching engagement between countershaft 48 and gear 60. In this case the delivery path includes input shaft 20, first speed ratio pinion 30, output gear 60, pinion 54 and final drive gear 56.

The second speed ratio operation is produced when the reverse idler 70 is placed in the neutral position out of engagement with the reverse pinion 32 and synchronizer sleeves 86, 112 in their neutral positions. Then 1-2 synchronizer sleeve 64 is shifted to the left and into engagement with the external clutch teeth 76 on gear 61. The torque delivery path in this case includes input shaft 20, input pinion 34, output gear 61, the countershaft 48, output pinion 54 and final drive gear 56.

For third speed ratio operation, the reverse gear 70 is again positioned in the neutral position out of engagement with the reverse input pinion 32 and synchronizer sleeves 64, 112 in their neutral positions. The 3-4 synchronizer clutch sleeve 86 is shifted to the right into engagement with the external clutch teeth 88 formed on the gear 62. In this way, the gear 62 is fixed to the countershaft 48 through the spline 84 formed on the inside diameter of the second synchronizer clutch hub 82. The torque delivery path for third speed ratio operation includes input shaft 20, input pinion 36, third speed ratio output gear 62, countershaft 48, output pinion 54 and final drive gear 56.

The fourth speed ratio occurs when the reverse pinion 70 is in its neutral position, disengaged from the reverse- pinion 32, the 1-2 clutch sleeve 64 is disengaged from gears 60 and 61 and sleeve 112 is in its neutral position. The 3-4 synchronizer clutch sleeve 86 is shifted to the left into engagement with the external clutch teeth 90 formed on the hub of the fourth speed ratio output gear 63. The torque delivery path for fourth speed ratio includes input shaft 20, the input gear 38, the output gear 63, the countershaft 48, the output pinion 54 and the output gear 56.

The third synchronizer clutch sleeve 112 is disengaged from gear 102 for first, second, third and fourth speed ratio operation as well as for reverse operation. Shifting 1-2 synchronizer sleeve 64 fore and aft produces a driving connection between gears 60 or 61 and the countershaft 48 by way of the spline 68. The 3-4 synchronizer clutch sleeve 86, when shifted into engagement with the clutch teeth of gears 62, 63, causes a driving connection between those gears and the countershaft 48.

Fifth forward speed ratio operation, which may be an overdrive condition, is produced when the reverse idler pinion 70, the 1-2 synchronizer sleeve 64 and the 3-4 synchronizer clutch sleeve 86 are neutrally positioned. In this case, the fifth speed synchronizer clutch sleeve 112 is shifted to the left into engagement with the external clutch teeth 114 formed on the hub of the fifth speed output gear 102 on the auxiliary countershaft 96. This action fixes gear 102 in driving relation on auxiliary shaft 96 by way of the splines 110 formed on the inside diameter of the third synchronizer clutch hub 108. The torque delivery path for a fifth speed ratio operation includes input shaft 20, input pinion 38, fifth speed output gear 102, auxiliary countershaft 96, fifth speed pinion 104 and output gear 56.

Figure 3:
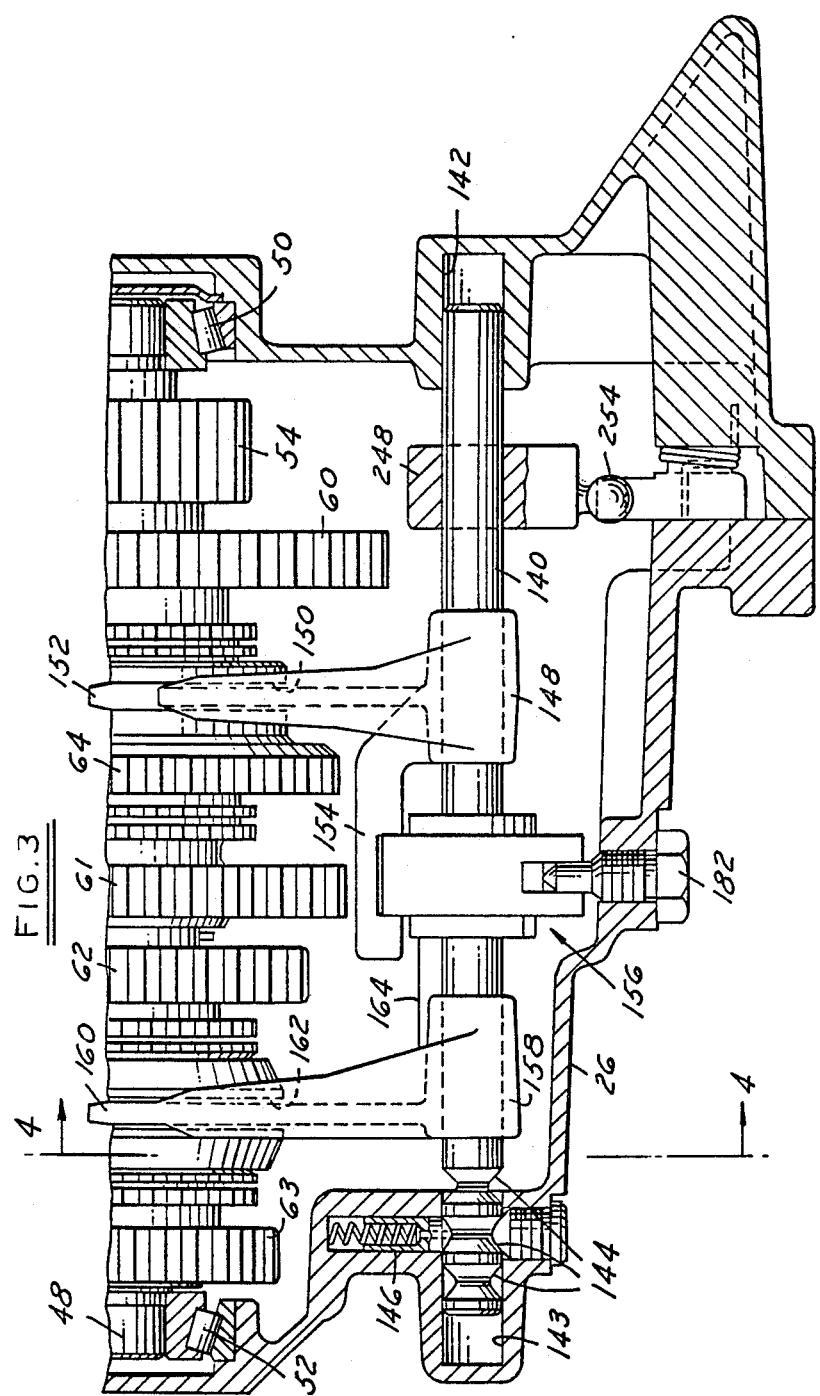
FIG. 3 is a cross-sectional view taken at the plane 3—3 of FIG. 1 showing a first shift rail with the first and second s forks mounted thereon.
Figure 9:
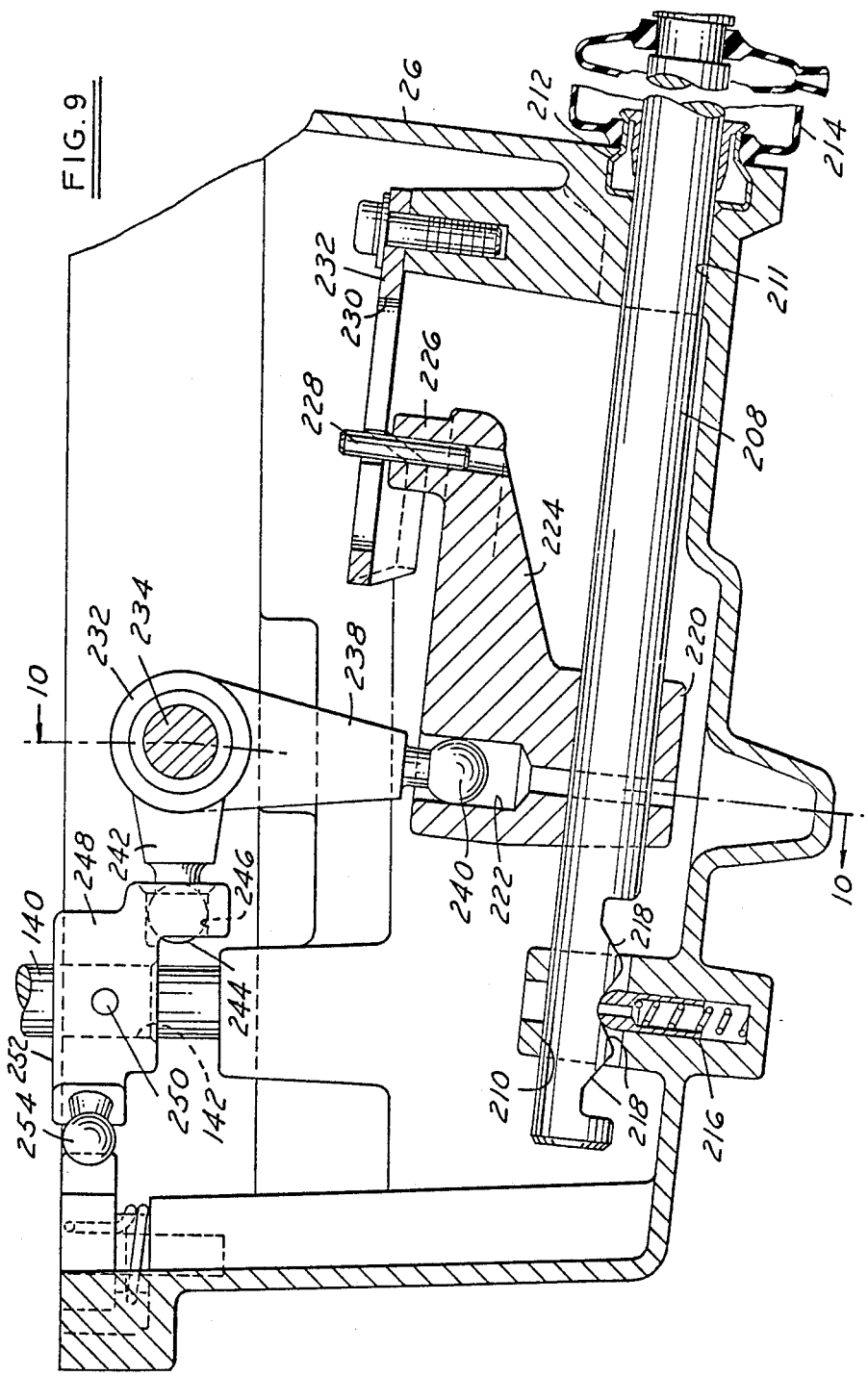
FIG. 9 is a cross-sectional view of the shift selector shaft and shift mechanism from the direction 9 of FIG. 7.

A first shift rail 140 (FIG. 3) is supported at each axial end in the cylindrical bore surfaces 142, 143, formed in the transmission and clutch housings 26 and 44. One end of the shift rail 140 has three circumferential grooves 144, which are engaged selectively by a detent pin 146 that is spring loaded and engages any of the recesses depending upon the axial position of the shift rail 140. The first shift fork 148 is movably supported on the shift rail 140 for rotation and axial displacement. The shift fork 148 includes selector fingers 152 which extend radially outward from the shift rail 140 and are received in an annular groove 150 formed in the hub of the reverse gear 64. Shift fork 148 has an arm portion 154 that extends toward a shift interlock mechanism generally indicated by the reference number 156.

A second shift fork 158 is slidably received over the shift rail 140 and includes selector fingers 160 that extend radially outward from shift rail 140 and are received in the annular groove 162 formed on the outer surface of the second synchronizer clutch sleeve 86. Shift fork 158 includes an axially extending arm 164 that is directed toward the shift interlock selector mechanism 156 and has a transverse notch to receive a selector finger that is a part of the interlock mechanism.

FIGS. 4 and 5 show the axially extending arms 154, 164 of the shift forks 148, 158, respectively, arranged around the circumference of the shift rail 140. A third arm 166, positioned adjacent fork arm 164, is one end of a bellcrank 166 that operates to shift the third shift fork 200 axially on a second shift rail 168.

FIG. 5 shows the shift interlock selector mechanism 156, the two arms 154, 164 and bellcrank end 166 arranged around the outer periphery of the shift rail 140. The interlock mechanism includes a selector sleeve 170, which is mounted on the outer surface of shift rail 140 and secured to it by a mounting pin. The selector sleeve 170 includes a selector finger 174 that extends radially outward from the axis of shift rail 140 to selectively engage the arms 154, 164 or 166 depending upon the angular position of shift rail 140. An interlock sleeve 172 is loosely fitted over the selector sleeve 170 and furnishes a slot 178 that extends parallel to the axis of the shift rail and a second circumferential slot 180. Axial slot 178 allows selector finger 174 to extend beyond the outer periphery of the interlock sleeve to selectively engage the arms 154, 164, 166. Interlock sleeve 172 rotates with shift rail 140 because of the contact of selector finger 174 in slot 178 and of the keyway fit of the outer contour of selector sleeve 170 within the interlock sleeve. Circumferential slot 180 receives the inner end of a mounting bolt 182, which is threaded into the transmission housing 26, and permits the shift rail and selector finger to rotate. The end of bolt 182 remains within slot 180 so axial shifting of the interlock sleeve is thereby prevented.

The interlock sleeve functions to prevent axial movement of shift forks 148, 158 and of bellcrank 184 unless selector finger 174 is aligned with the notches formed in arms 154, 164 and in bellcrank arm 166. For example, in FIGS. 5 and 6 selector finger 174 is shown to be engaged with arm 166 of the bellcrank 184 and a blocking flange 186 of sleeve 172 is seen to engage arms 154, 164 thereby preventing axial shifting of the first and second shift forks 148, 158. Alternatively, if shift rail 140 were rotated to align selector finger 174 with arm 164, the blocking flange 186 would prevent axial shifting movement of the first shift fork 148 because the blocking flange 186 would still be engaged with the arm 154. In this instance, a second blocking flange 188 will be rotated into engagement with bellcrank end 166, thereby preventing rotation of bellcrank 184 about the axis of the stub shaft 190 on which it is journalled. Similarly, when shift rail 140 is rotated to align selector finger 174 with arm 154, blocking flange 188 will engage both the arm 164 and the bellcrank end 166 thereby preventing axial shifting of the second shift fork 158 and rotation of the bellcrank 184.

Bellcrank 184 has an operating end 192 from which a pin 194 extends within an open-ended slot 196 formed on an extension 198 of a third shift fork 200. The shift fork is fixed to the second shift rail 168, which is disposed parallel to the input shafts and is mounted at each axial end on a support surface formed in the transmission housing that allows axial movement of the shift rail. The third shift fork 200 includes selector fingers 202 which engage the annular groove 204 formed on the outer surface of the third synchronizer clutch sleeve 112.

When bellcrank 184 is rotated about the axis of stub shaft 190 in response to axial movement of the shift rail 140, the third shift fork 200 causes the third synchronizer clutch sleeve 112 to move into engagement with the external clutch teeth 114 of the fifth speed ratio gear 102. This action causes a driving connection to be produced between gear 102 and the auxiliary countershaft 196.

The fifth speed ratio shift bellcrank 184 terminates at its end 166 in an opening between two prongs 206, 207, which receive the selector finger 174 therebetween. When shift rail 140 is rotated into alignment with the end 166 and then shifted axially, selector finger 174 causes bellcrank 184 to pivot about the stub shaft axis 190. This movement causes the shift fork 200 to move synchronizer sleeve 112 into driving engagement with the auxiliary countershaft 96. When the shift cane is returned to the neutral position, shift rail 140 is moved axially causing bellcrank 184 to return to its neutral position and shift fork 200 to disengage the synchronizer sleeve 112 from gear 102 thereby disengaging the driving connecting between the auxiliary countershaft 96 and the fifth speed ratio gear 102.

The gear selector mechanism for controlling the motion of the synchronizer clutches is illustrated in FIGS. 7–10. A main shift selector shaft 208 is slidably mounted in openings 210, 211 formed in the transmission housing. Opening 211 is provided with a fluid seal 212 and a protective flexible boot 214 at one end of the shift selector shaft 208. At the opposite end of shaft 208, a detent pin 216 is biased by a spring to engage recesses 218 formed on the shaft. The pin holds the selector shaft in the selected position and prevents its inadvertent axial movement, but allows rotary movement about the central axis of the shaft. A selector block 220 is fixedly secured to shaft 208 and has a cylindrical socket 222 formed therein which extends in a generally radial direction from the shaft. A guide pin arm 224 integrally formed with the block 220 has a terminal boss 226 that receives a guide pin 228 disposed generally in a radial direction with respect tot he axis of the selector shaft 208. Guide pin 228 is received in the slots 230 of the guide plate 231, which is mounted on an interior surface of the transmission housing 26. The guide pin 228 is required to move within the spacer defined by the slots 230 thereby limiting the range of motion of the selector shaft 208. The vehicle operator controls the rotation and axial displacement of the selector shaft 208 by way of the control he exercises over a shift cane positioned generally perpendicular to the axis of the shaft 208 and extending into the passenger compartment of the vehicle. The conventional shift pattern through which the shift cane may move in selecting the various speed ratios of the transmission is shown in FIG. 11.

A relay lever 232 for transmitting the motion of the selector shaft 208 to the first shift rail 140 is journalled on a stub shaft 234. Shaft 234 is supported on the transmission housing and is secured thereto by the pin 236. The relay lever 232 has a first arm 238 that extends radially outward from the axis of stub shaft 234 and has a spherical end portion 240 that is received in the cylindrical socket 222 of the selector block 220. A second arm 242 extending radially outward from the axis of stub shaft 234 has a spherical end 244 fitted within a cylindrical socket 246 formed in a collar 248, which is fixed to shift rail 140 by a pin 250. The axis of socket 246 extends radially outward from the axis of shift rail 140. A second arm 252 formed integrally with a collar 248 and extending outwardly from the axis of the shift shaft 140 has a spherical end 254.

Shift rail 140 is journalled in the transmission housing within cylindrical bores 142, 143 for rotation and axial sliding motion. Collar 248 is pinned to rail 140; therefore, when relay lever 232 moves axially on stub shaft 234, collar 248 and rail 140 rotate. When relay lever 232 rotates about the axis of stub shaft 234, collar 248 and rail 140 move axially. Similarly, when selector shaft 208 moves axially on the support surfaces 210, 211, relay lever 232 rotates about the axis of the stub shaft 234. When selector shaft 208 rotates about its central axis, relay lever 232 slides axially on the outer surface of the stub shaft 234.

Figure 10:
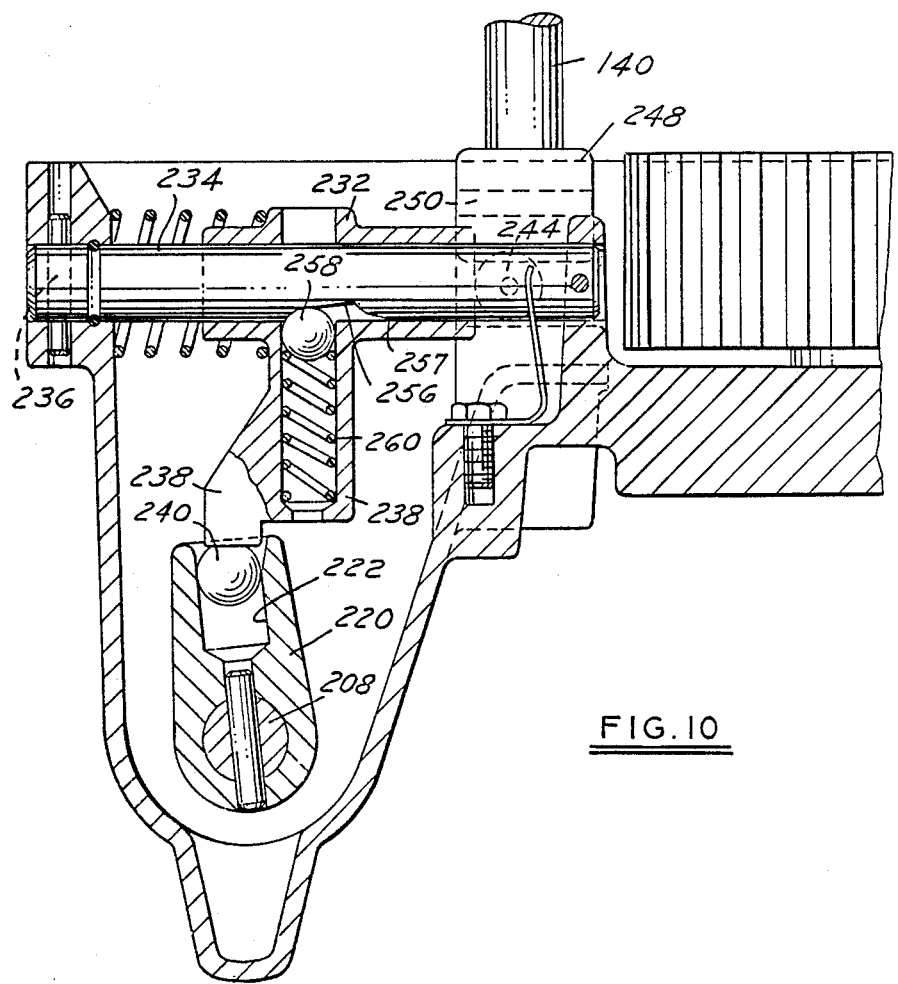
FIG. 10 is a cross-section taken at plane 10—10 of FIG. 9 showing the selector shaft, relay lever and first shift rail of the shift mechanism.

As seen in FIG. 10, stub shaft 234 has two annular recesses 256, 257 that are engageable by a ball 258, which is biased by a spring 260 mounted on the arm 238. When relay lever 232 slides axially on stub shaft 234, the detent ball moves first within the recess 256 and, when the mechanism is positioned for fifth speed ratio operation, the detent ball engages the recess 257. In passing from the recess 256 to the recess 257, the spring 260 is compressed, a greater force is applied to the relay lever 238, and the vehicle operator experiences the need for increased effort to be applied to the shift cane in order to position the mechanism for fifth speed ratio operation. Similarly, when relay lever 232 moves in the opposite direction to produce reverse drive, ball 258 is displaced and applies a reverse inhibiting force which is sensed by the operator who must apply a reaction force sufficient to compress spring 260.

FIGS. 7 and 8 show that portion of the shifting mechanism that operates to place the gearing in position for reverse drive. As collar 248 is rotated about the axis of shift rail 140, the spherical end 254 on the shift collar 248 can be brought into engagement with a notch 262 that is formed on the end of the reverse shift bellcrank 264. The bellcrank 264 is journalled on the surface of a stub shaft 266, which is fixedly mounted on the transmission housing 26. A reverse shift inhibitor and back-up light assembly 268 includes a detent portion 270 which is biased inwardly by the coil spring 272 to seat in a mating surface formed on the bellcrank 264. The operating end of the bellcrank has a pin 274 mounted thereon and extending transversely into an annular recess 278 formed on the reverse idler pinion 70. Idler pinion 70 is slidably mounted on the support shaft 276 for axial movement in response to rotation of the bellcrank 264. The support shaft is fixed at one end to a support block 280 which is secured to the transmission housing by the attachment bolt 282. At the opposite end, shaft 276 is received in an opening 284 in the transmission housing.

In operation, movement of the shift cane to the neutral position in the reverse gear plane of FIG. 11, causes selector shaft 208 to rotate about its axis, relay lever 232 to move axially on stub shaft 234 and shift collar 248 to rotate its spherical end 254 into engagement with the notch 262. When the spherical end 254 engages the notch 262, the arm 286 of the pawl 288 is caused to rotate out of engagement with the notch 262. The pawl 288 is biased by a torsion spring 290 so that its arm 286 engages notch 262, as shown in FIG. 7, except when reverse gear is selected. When the spherical end 254 is rotated away from the notch 62, the arm 286 will again be received in the notch 262. When the vehicle operator moves the shift cane in the reverse plane to the reverse drive position, shift selector shaft 208 moves axially, relay lever 232 rotates about the axis of the stub shaft 234, shift collar 248 and shift rail 140 move axially, and bellcrank 264 pivots about the axis of the stub shaft 266. Rotation of bellcrank 264 causes the reverse idler pinion 70 to slide on its support shaft 276 and into meshing engagement with the reverse gears 32 and 64.

Return movement of the shift cane in the reverse drive plane to the neutral position causes the reverse idler pinion 70 to become disengaged from the reverse gears 32, 64. Upon movement of the shift cane out of the reverse drive plane, spherical end 254 disengages notch 262, pawl arm 286 is reengaged in notch 262, and the reverse inhibitor detent pin 270 is reseated in its mating surface on the bellcrank 264. The detent 270 is depressed within the assembly 268 and completes an electrical circuit that can operate to light the backup lamp of the vehicle when the shift mechanism is positioned for reverse drive operation.

FIG. 11 shows the shift motion diagram through which the manually controlled shift cane is moved by the vehicle operator to select the various driving ratios of the transmission.

Having described a preferred form of my invention what I claim and desire to secure by U.S. Letters Patents is:

1. A multiple speed ratio manual transmission for an automotive vehicle comprising:
    a power input shaft;
    a first countershaft;
    gearing defining multiple torque delivery paths including multiple pairs of gears carried by the input shaft and by the first countershaft;
    first synchronizer clutch means engageable with one gear of each pair for connecting said one gear to the shaft on which it is carried;
    a second countershaft;
    a gear carried by the second countershaft meshing with one gear carried by the input shaft that is a member of one of the aforementioned gear pairs;
    a second synchronizer clutch means for connecting the second countershaft to the gear carried thereon;
    a differential mechanism;
    torque output gearing connecting the differential to the first and second countershafts including a first output gear carried by the first countershaft a second output gear carried by the second countershaft, each output gear meshing with a final drive gear that drives the differential;
    a gear ratio selector shaft mounted for linear movement along its axis and rotation about its axis;
    a first selector block fixed to the selector shaft;
    a relay lever mounted for rotation about and axial displacement along an axis that extends transversely with respect to the gear ratio selector shaft having one arm connected to the first selector block, whereby linear movement of the selector shaft produces rotation of the relay lever and rotation of the selector shaft produces linear movement of the relay lever;
    a first shift rail mounted for rotation about and axial displacement along an axis that extends transversely with respect to the axis of the gear ratio selector shaft and connected to the relay lever;
    first shift fork means carried by the first shift rail, engaged with the first synchronizer clutch means, selectively connectable to the first shift rail; and
    a second shift rail selectively connectable to the first shift rail, mounted for linear movement along its axis:
    second shift fork means carried by the second shift rail engaged with the second synchronizer clutch means selectively connectable to the first shift rail;
    whereby rotation of the selector shaft connects either the first, or second shift fork means to the first shift rail and linear movement of the selector shaft after such connected is made produces a driving connection between one gear of each pair to the first countershaft or a driving connection between the second countershaft and the gear carried thereon.

2. The transmission of claim 1 further comprising:
    a reverse idler pinion selectively shiftable into and out of engagement with one of the pairs of gears whereby a geared connection is established and disestablished therebetween;
    a pivotably mounted reverse idler bellcrank having one end connected to the reverse idler pinion; and
    a second selector block fixed to the first shift rail, connected to the relay lever and adapted for selective connection to a second end of the reverse idler bellcrank;
    whereby rotation of the selector shaft causes a connection to be made between the second selector block and the reverse idler bellcrank and linear movement of the selector shaft after such connection is made causes the reverse idle bellcrank to pivot, thus shifting the reverse idler pinion into or out of engagement with its associated pair of gears.

3. The transmission of claim 1 wherein the first and second output gears are in continuous meshing engagement with the final drive gear and wherein the gear carried by the second countershaft and one gear carried by the first countershaft are in continuous meshing engagement with one gear of the input shaft.

4. A multiple speed manual transmission mechanism comprising:
    a power input shaft having fixed thereto first, second and third pinions for the first, second and third speeds, a fourth pinion for the fourth and fifth speeds, and a reverse pinion;
    a final drive gear mounted for rotation about an axis that is parallel to the input shaft;
    a first countershaft disposed parallel to the input shaft including a first final drive pinion fixed thereto and drivably engaged with the final drive gear, first, second third and fourth speed gears journalled thereon continuously engaged with the first, second, third and fourth pinions, respectively;
    a second countershaft disposed parallel to the input shaft including a second final drive pinion fixed thereto drivably engaged with the final drive gear and a fifth speed gear journalled thereon continuously engaged with the fourth pinion;

a first synchronizer clutch drivably connected to the first countershaft, adapted to drivably connect the first and second pinions to the first countershaft having a reverse pinion formed thereon;

a second synchronizer clutch drivably connected to the first countershaft adapted to drivably connect the third and fourth pinions to the first countershaft;

a third synchronizer clutch drivably connected to the second countershaft, adapted to drivably connect the fifth pinion to the second countershaft;

a reverse idler pinion mounted for sliding movement into and out of driving engagement with the reverse gear on the input shaft and the reverse gear on the first synchronizer clutch;

means for selectively shifting the first, second and third synchronizer clutches to establish and disestablish a driving connection between the pinions and the countershaft on which they are journalled; and means for selectively shifting the reverse idler pinion into driving engagement with the reverse drive gears thereby driving the first final drive pinion and the final drive gear in a direction opposite from that of the forward drive and for selectively shifting the reverse drive idler out of driving engagement with the reverse drive gears.

* * * * *